United States Patent [15] 3,673,855
Garday et al. [45] July 4, 1972

[54] LEAKAGE FLOW MONITOR

[72] Inventors: Louis C. Garday, Woodland Hills; Arthur A. Nemechek, Glendale, both of Calif.

[73] Assignee: Lockheed Aircraft Corporation, Burbank, Calif.

[22] Filed: March 10, 1971

[21] Appl. No.: 122,750

[52] U.S. Cl. ............................................................ 73/40
[51] Int. Cl. .................................................... G01m 3/26
[58] Field of Search ............................ 73/37, 40, 46, 40.5 R; 340/242

[56] References Cited

UNITED STATES PATENTS

| | | | |
|---|---|---|---|
| 2,734,960 | 2/1956 | Reynolds | 340/242 X |
| 3,360,982 | 1/1968 | Mitchell et al. | 73/40 |
| 3,495,546 | 2/1970 | Brown et al. | 73/40.5 R |

Primary Examiner—Louis R. Prince
Assistant Examiner—William A. Henry, II
Attorney—Matthew P. Lynch and George C. Sullivan

[57] ABSTRACT

A leakage flow measuring device for hydraulic systems has a body member with a bore interconnecting an inlet and an outlet designed for inline connection in a system. A flow restricting piston is within the bore and moves to a non-flow interfering position in response to operational fluid flow. The piston has a transducer connected to one end and a metering orifice in the opposite end. The metering orifice is of a predetermined dimension which allows fluid up to a predetermined volume to flow therethrough, with the transducer as a function of piston travel. Flow during quiescent periods of a system is indicative of system or component leakage.

13 Claims, 4 Drawing Figures

PATENTED JUL 4 1972

LOUIS C. GARDAY
ARTHUR A. NEMECHEK
*INVENTORS.*

BY *George C. Sullivan*
Agent

*Matthew P. Lynch*
Attorney

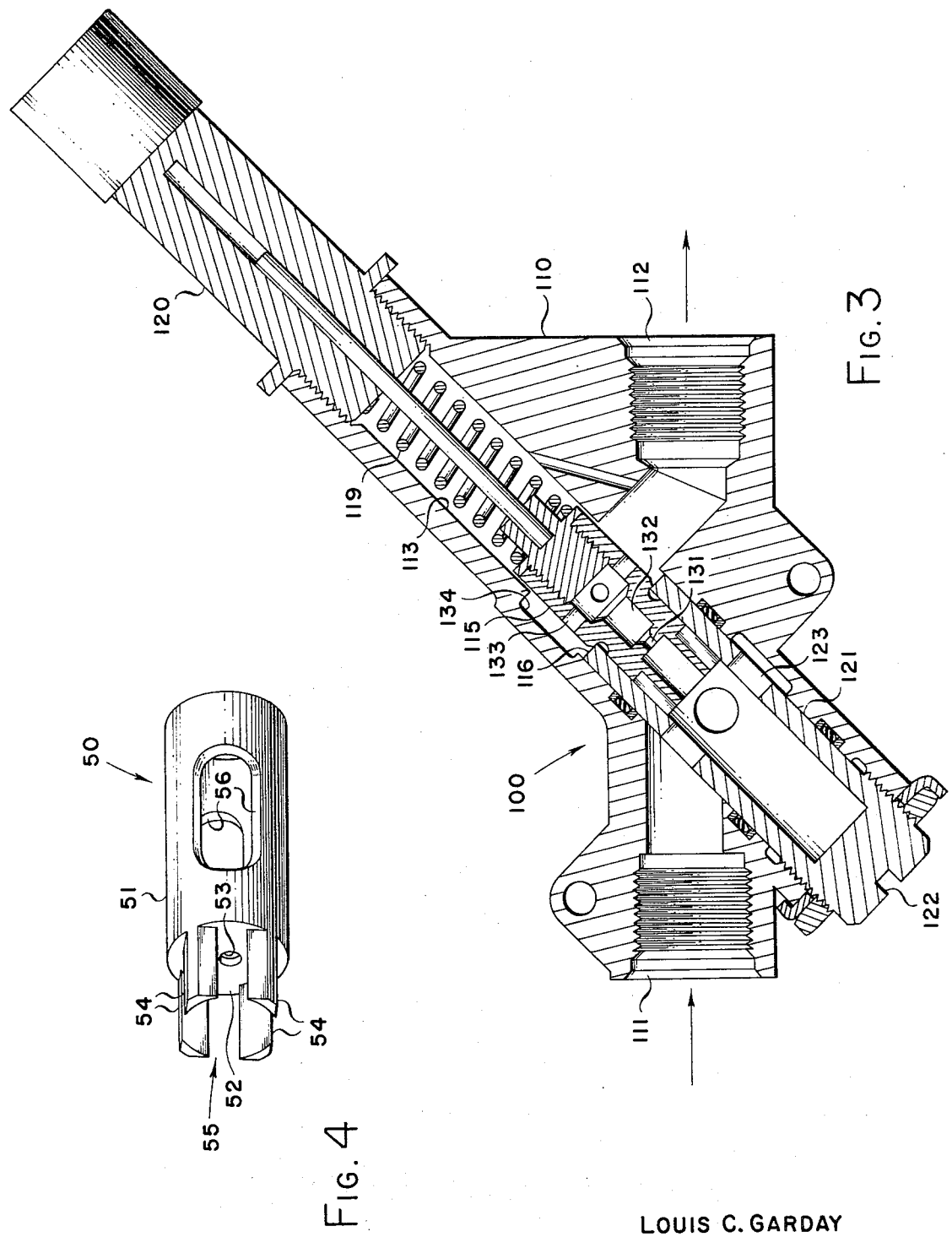

3,673,855

LEAKAGE FLOW MONITOR

BACKGROUND OF THE INVENTION

One of the most effective measurements of hydraulic system or component condition is leakage which normally results from usage, wear and malfunction.

In the past the only method by which hydraulic component wear could be determined was to disassemble the system and inspect the components for wear. This obviously was an inefficient and expensive situation since, quite often, after the component was removed and inspected it was determined to be in satisfactory condition. In order to eliminate the necessity of removing the individual components for inspection, a number of leakage monitoring and test systems have been devised. However, in all currently known systems it is necessary that the hydraulic system be interrupted and the test monitor placed in the line and measurements taken and then the monitor is removed and the system reassembled before operation. Characteristically, these measurements are not taken under system operating conditions because of the necessity of breaking into the hydraulic line. Tests of this nature are, at best, performed under abnormal conditions and the steps of partially dismantling the system and reassembling can result in less than complete assurance of operativeness of the system when reassembled. The above operations are costly in terms of man-hours and system down-time. Therefore, it is a desirable objective that a continuous inline monitoring system be developed for use at any time, as in the case of an aircraft in the air, on the ground, or under maintenance.

In order to solve the aforementioned problems, the applicants have devised an inline leakage flow monitoring system designed for permanent installation in a hydraulic system downstream from the operated device and including a relatively large area piston with a flow metering orifice therethrough. A spring biases the piston against an integral stop in the absence of operating flow differential pressure on the upstream side. Coupled to the piston is a sensor which develops an electrical signal indicative of piston displacement.

Since the monitoring device is designed for permanent inline installation, it is not necessary to disassemble the system to insert a metering device therein. Additionally, the electrical output, which is indicative of piston travel which in turn is indicative of quiescent fluid flow, can be connected to a readout device at a remote location.

In one embodiment the sensor is configured to be located in the hydraulic system as a replacement of a right angle bend or elbow. In another embodiment the leakage sensor is designed with a straight line flow pattern with the flow sensor piston positioned for angular movement with respect to the normal direction of fluid flow.

The features of this invention will be more clearly understood from the following detailed description and by reference to the drawings in which:

FIG. 3 is a vertical section through an alternate embodiment of this invention; and FIG. 4 is a perspective view of an alternate embodiment of the flow restricting element.

DETAILED DESCRIPTION OF THE INVENTION

Figure 1:
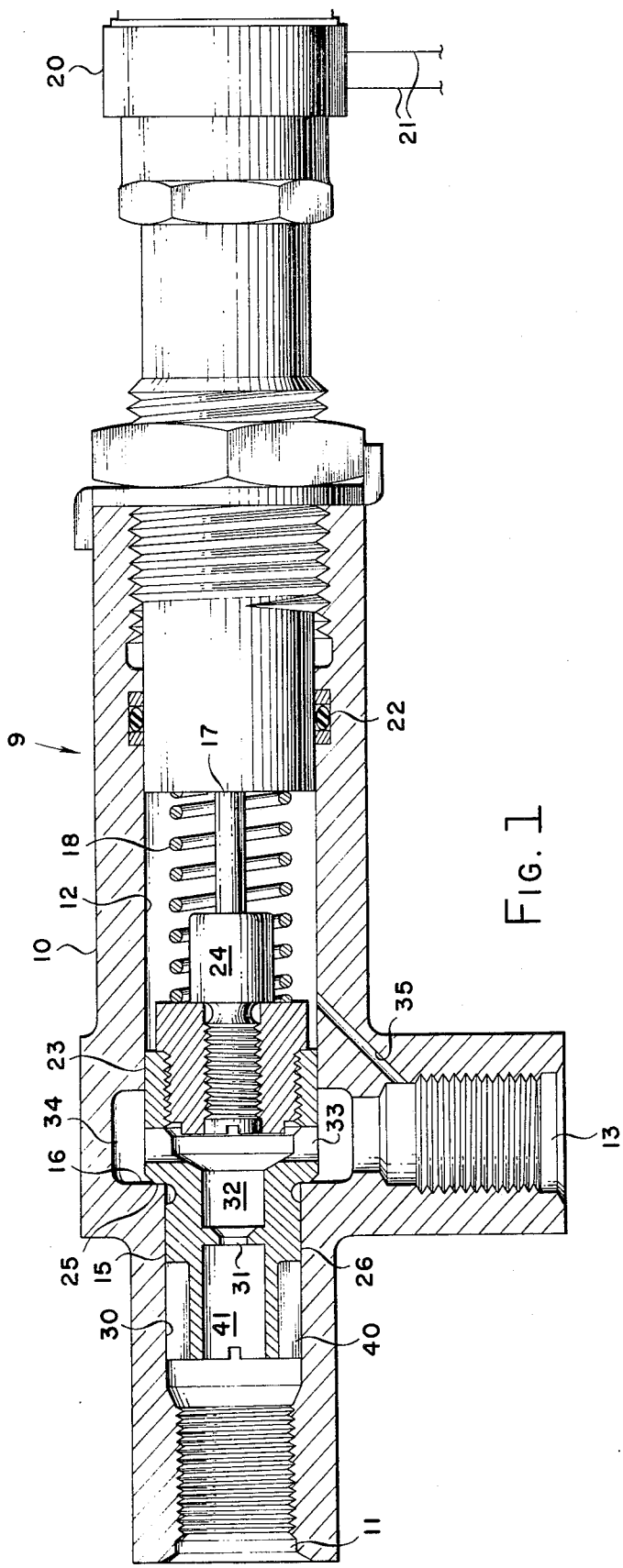
FIG. 1 is a longitudinal section through a flow sensor of this invention.

Now refer to FIG. 1 of the drawings where a first embodiment of a leakage flow sensor 9 in accordance with this invention is illustrated. The sensor 9 comprises a body 10 having an inlet port 11, a central bore 12 and an outlet port 13, interconnected for fluid flow therethrough. A flow restricting element or piston 15 is positioned in the bore 12 coaxially aligned with the port 11 for reciprocal sliding movement towards and away from an integral stop 16 in the body 10. The element 15 is adapted to move away from the stop 16 into the central bore 12 in order to provide virtually unimpeded flow through the outlet port 13 when the system is subjected to operating flow conditions.

The element 15 is maintained in its flow restricting position during quiescent flow conditions by a resilient means or spring 18 which biases the flow restricting element 15 against the stop 16. Coupled to the element 15 is a shaft 17 which extends through the body 10 to a displacement sensor or potentiometer 20 which is connected by suitable electric leads 21 to a remote meter readout device (not shown).

The displacement sensor 20 as shown in FIGS. 1 and 3 is partially disposed within the body 10 in longitudinal alignment with the direction of piston travel, whereby the shaft 17 is caused to change its position within the sensor in response to movement of the piston 15. One method of securing the sensor 20 to the body is by threaded engagement. Such an adjustable engagement would allow the biasing force of the resilient means 18 and the depth of penetration of the shaft 17 to be varied in accordance with the position of the sensor 20. While a number of different sensors can be utilized in applicants' invention, an example of a sensor capable of functioning in accordance with this invention is manufactured by Pickering Inc. of Plainview, New York, under their Part No. 72470.

The body 10 includes an appropriate seal such as an O-ring 22 to prevent the leakage of hydraulic fluid past the sensor 20. The flow restricting element 15 as shown in FIG. 1 includes an enlarged rear portion 23 having an external diameter complementary to the diameter of the bore 12. The complementary or corresponding diameters of the portion 23 of the element 15 and the bore 12 of the body 10 are designed to allow smooth sliding movement of the piston 15 within the bore 12 while permitting a minimum amount of fluid to flow by the piston. The element 15 further includes a rear plug 24 with internal threads for engaging a threaded end portion of the shaft 17. An annular front face 25 of the element 15 is adapted to abut the stop 16 to provide a calibrated zero flow position with regard to the sensor 20 when the element 15 is in its normal closed position in abutment to the stop 16. The element 15 includes an extension 26 of reduced diameter in slidable minimum leakage fit within a bore 30 constituting a continuation of the inlet port 11. The element 15 has a metering orifice 31 communicating with the inlet 11 to allow fluid leakage from the component to pass through the flow restricting element 15 via the orifice 31 into an internal cavity 32 within the element 15, then through a plurality of ports 33 extending radially from the cavity 32 through the element 15 to a manifold 34 in the body 10. The manifold 34 communicates with the outlet port 13 thereby allowing the leakage flow through the ports 33 to vent through the outlet port 13.

The area of the extension 26 of the flow restricting element 15 exposed to the inlet 11 and the dimensions of the orifice 31 are such that upon a predetermined flow through the orifice 31 the pressure differential across the orifice 31 will produce a displacement of the flow restricting element 15 as a function of the leakage flow at the inlet port 11 at flows below system command or operational flow. The displacement of the element 15 is transmitted via shaft 17 to the sensor or potentiometer 20. The displacement of the element 15 during these non-operating conditions of the system measures the leakage flow of the system which indicates the degree of wear and seal performance of an operating device upstream thereof.

The flow sensor 9 of this invention is normally, but not necessarily, positioned in the return line of the hydraulic system downstream of the controlled or actuated component. The area of the flow restricting element orifice 31, the frontal area of the element 15 exposed to inlet flow and the spring constant of spring 18 are correlated such that the lowest operating flow pressure of the system is sufficient to compress the spring 18 and move the element 15 to a position within the bore 12 that is out of the flow path between the inlet 11 and the outlet 13, thereby minimizing flow restriction. The frontal or inlet end of the flow restrictor 15 includes a plurality of edge recesses 40 as well as a central passage 41, the latter of which communicates with the orifice 31. The edge recesses 40 are adapted to communicate with the manifold 34 when the flow restricting element 15 is retracted into the bore 12 thereby providing minimal interference with fluid flow through the device from the inlet port 11 to the outlet port 13 during normal system operating flow pressures.

In the embodiment of FIG. 1, the volume of bore 12 behind the element is exposed to the hydraulic fluid which leaks past the piston 15 therefore the damping characteristics of the hydraulic fluid surrounding the spring has an effect upon the sensitivity of the piston to leakage flow and to its response in the presence of operating pressures. It is recognized that suitable seals or damping relief of hydraulic pressure in the spring region can be obtained employing principles well known in the hydraulic art. In the present embodiment a bleed passage 35 has been provided in order to allow the fluid disposed within the bore 12 behind the piston 15 to vent into the outlet port 13. The diameter of the bleed passage 35 will be instrumental in controlling the response rate of the piston 15 and if desired the bleed passage can be provided with a needle valve which will enable the piston response rate to be varied by the operator.

Figure 2:
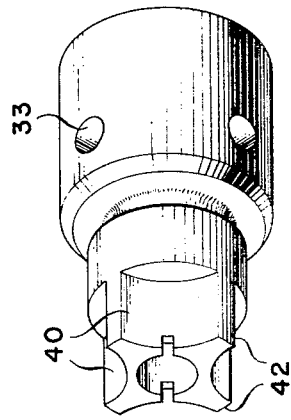
FIG. 2 is a perspective view of a flow restricting element.

The actual configuration of one embodiment of the flow restricting element 15 is clearly shown in FIG. 2 where the edge recesses 40 appear as concave chambers separated by land portions 42. The ports 33 in the main body portion 23 of the flow restricting element 15 are also clearly visible in FIG. 2.

An alternate embodiment of the flow restricting element 15 is illustrated in FIG. 4 under the general numerical designation 50. The element 50 serves the same purpose and operates in the same manner as the piston 15. The element 50 comprises a cylinder 51 having a closure 52 at one end, the closure 52 has a centrally disposed orifice 53 which allows fluid leakage to enter the interior of the cylinder. Extending outwardly from the periphery of the closure 52 symmetrically about the longitudinal axis of the element 50 are four lands 54. The lands 54 form a circle having an outer diameter complementary to that of the cylinder 51 and are separated by full flow openings 55. The cylinder 51 has a plurality of ports 56 disposed about its periphery intermediate its ends, such ports allow the fluid entering the cylinder 51 through the orifice 53 to exit from the cylinder into the manifold 34 which in turn communicates with the outlet port 13. The open end of the cylinder 51 is internally threaded for engaging the threaded end portion of the shaft 17 in the same manner as element 15.

By providing the element 50 with a constant diameter, the dual diameter internal bore of the body 10 can be eliminated and the body 10 provided with a constant internal diameter complementary to the external diameter of the piston 50. When utilizing the element 50 within a constant diameter body 10 the internal surface of the body must be provided with a stop adjacent the inlet port 11. The position of the stop should be such as to provide a calibrated zero flow position with regard to the sensor 20 when the piston 50 is in its closed position. The closed position of the piston 50 is determined by the abutment of the free ends of the lands 54 against the stop within the body 10. The location of the stop is additionally influenced by the length of the piston 50 in a manner such that the full flow openings 55 are in communication with the manifold 34 when the system is subjected to normal operating flows.

Now refer to FIG. 3 where a leakage flow sensor 100 constructed in accordance with this invention and designed for in-line installation may be seen. The sensor 100 includes a body 110 having an inlet port 111 and an outlet port 112 axially aligned in a manner such that the device may be inserted directly into a straight section of the fluid line of the hydraulic system. In the present embodiment, a bore 113 within the body 110 is inclined at an acute angle with respect to a line connecting the inlet and outlet ports 111 and 112. A flow restricting element 115 disposed within the bore 113 is connected by a shaft 117 to a position sensor 120 which is secured to one end of the body 110. In the embodiment of FIG. 3, the flow restricting element 115 includes an orifice 131 and an internal cavity 132 connected via ports 133 and a manifold 134 to outlet port 112. As configured, the flow restricting element 115 is displaced, by system operating fluid flow entering at port 111, to a position, upward and to the right, in the drawing, out of its flow restricting position. During non-operating conditions, the element 115 rests against a stop 116. The stop 116 consists of a cylinder 121 closed at one end, the opposite end being open and adapted to be screwed into the bore 113, by providing a slot 122 in the closed end of the cylinder 121; the cylinder can be adjusted relative to its depth of penetration into the bore 113. As in the embodiment of FIG. 1 the adjustment is determined by the dimensions of the element 115, the anticipated flow pressures, the spring constant of a biasing means, the size of the orifice 131 and the relative position of the position sensor 120. Since the cylinder 121 intersects the inlet port flow passageway, the cylinder is provided with a plurality of openings 123 which enables the fluid entering the inlet 111 to pass through the openings 123 into the cylinder 121 which is in communication with the orifice 131. It will be noted that the embodiment of FIG. 3 utilizes an element 115 constructed substantially as shown in FIG. 2. A spring 119 is disposed about the shaft 117 in abutment to the element 115 and the sensor 120. The spring 119 serves to bias the element 115 towards the stop 116 during quiescent flow and has a spring constant designed to allow the element 115 to be displaced away from the stop 116 as a function of inlet leakage flow through the orifice 131 in the same manner as in FIG. 1.

The above described embodiments of this invention are merely descriptive of its principles and are not to be considered limiting. The scope of this invention instead shall be determined from the scope of the following claims including their equivalents.

We claim:

1. A leakage flow monitor comprising:
    a body member having a bore interconnecting an inlet and an outlet;
    a flow restricting means disposed within the bore intermediate said inlet and said outlet, said flow restricting means having a metering orifice therethrough;
    means biasing said flow restricting means towards a flow impeding position, said biasing means and the metering orifice cooperatively correlated to provide minor displacement of said flow restricting means in response to leakage flow through the inlet port and displacement of said flow restricting means to a minimum flow interference position in response to the lowest system operating flow; and
    sensing means responsive to displacement of said flow restricting means due to leakage flow.

2. A leakage flow monitor in accordance with claim 1 wherein said flow restricting means comprises a piston having the metering orifice exposed to inlet fluid, the orifice communicating with a cavity within said piston and the cavity communicating with said outlet through a plurality of ports in said piston when said piston is in its flow impeding position.

3. A leakage flow monitor in accordance with claim 2 wherein a face of said piston is held in abutment to a stop within said bore by said biasing means when there is no fluid flow through said inlet.

4. A leakage flow monitor in accordance with claim 3 wherein the abutting face of said piston has a plurality of lands extending inwardly along a portion of the length of the piston, said lands being separated by a plurality of recesses.

5. A leakage flow monitor in accordance with claim 4 wherein the recesses are normally closed when said piston is in its flow impeding position and in communication with the manifold when said piston is in its minimum flow interference position.

6. A leakage flow monitor in accordance with claim 2 wherein said body has a manifold disposed within the bore in communication with said outlet and whereby the ports are in communication with the manifold when said piston is in its flow impeding position.

7. A leakage flow monitor in accordance with claim 2 wherein said body has a bleed passage disposed therein whereby fluid within the bore may communicate with said outlet when said flow restricting means is in its flow impeding position.

8. A leakage flow monitor in accordance with claim 1 wherein said sensing means comprises a linear displacement measuring device responsive to movement of said flow restricting means.

9. A leakage flow monitor in accordance with claim 8 wherein said sensing means is mechanically coupled to said flow restricting means.

10. A leakage flow monitor in accordance with claim 8 wherein said linear displacement measuring device comprises a potentiometer.

11. A leakage flow monitor in accordance with claim 1 wherein said biasing means comprises a spring disposed between said flow restricting means and said sensing means.

12. A leakage flow monitor in accordance with claim 9 wherein a shaft is secured to said flow restricting means and extends coaxially thereto in slidable disposition within said sensing means whereby movement of said flow restricting means causes said shaft to change its relative penetration within said sensing means.

13. A leakage flow monitor comprising:
a body member having a bore interconnecting an inlet and an outlet, a manifold disposed within the bore adjacent said outlet;
a piston disposed within the bore intermediate said inlet and said outlet, said piston having a metering orifice exposed to fluid entering said inlet, the orifice communicating with a cavity within said piston and the cavity communicating with said outlet through a plurality of ports in said piston when said piston is in its flow impeding position, said piston having a plurality of recesses about its periphery disposed longitudinally thereto, the recesses allowing fluid entering said inlet to exit through said outlet when said piston is in its minimum flow interference position;
a linear displacement measuring device mechanically coupled to said piston for indicating movement of said piston relative to said displacement measuring device; and
a spring disposed within the bore between said piston and said linear displacement measuring device, said spring biasing said piston toward a flow impeding position adjacent said inlet, said spring having characteristics complementary to the metering orifice permitting said piston to be displaced in response to leakage flow through said inlet, the amount of displacement being measured by said measuring device, and permitting said piston to be displaced to a minimum flow interference position whereby the recesses are in communication with the manifold in response to the lowest system operating flow.

* * * * *